US012627841B2

(12) United States Patent
Yu et al.

(10) Patent No.: US 12,627,841 B2
(45) Date of Patent: May 12, 2026

(54) VIDEO ENCODING METHOD, VIDEO DECODING METHOD, NON-TRANSITORY COMPUTER-READABLE MEDIUM

(71) Applicant: GUANGDONG OPPO MOBILE TELECOMMUNICATIONS CORP., LTD., Dongguan (CN)

(72) Inventors: Yue Yu, Palo Alto, CA (US); Haoping Yu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/869,479

(22) PCT Filed: Jun. 2, 2023

(86) PCT No.: PCT/US2023/024324
§ 371 (c)(1),
(2) Date: Nov. 26, 2024

(87) PCT Pub. No.: WO2023/235588
PCT Pub. Date: Dec. 7, 2023

(65) Prior Publication Data
US 2025/0227302 A1      Jul. 10, 2025

Related U.S. Application Data

(60) Provisional application No. 63/365,761, filed on Jun. 2, 2022.

(51) Int. Cl.
*H04N 19/70* (2014.01)
*H04N 19/105* (2014.01)
(Continued)

(52) U.S. Cl.
CPC ........... *H04N 19/70* (2014.11); *H04N 19/105* (2014.11); *H04N 19/119* (2014.11); *H04N 19/1883* (2014.11)

(58) Field of Classification Search
CPC .... H04L 47/38; H04N 19/105; H04N 19/119; H04N 19/124; H04N 19/129;
(Continued)

(56) References Cited

U.S. PATENT DOCUMENTS

| | | | |
|---|---|---|---|
| 11,786,596 B2 * | 10/2023 | Wang ................. | A61K 31/7048 375/240.18 |
| 2012/0163448 A1 * | 6/2012 | Zheng ................... | H04N 19/61 375/E7.138 |

(Continued)

OTHER PUBLICATIONS

De Rivaz et al., "AV1 Bitstream & Decoding Process Specification", Version 1.0.0 with Errata 1, dated Jan. 8, 2019, 681 pages.
(Continued)

*Primary Examiner* — Christopher S Kelley
*Assistant Examiner* — Ana Picon-Feliciano
(74) *Attorney, Agent, or Firm* — Sheppard, Mullin, Richter & Hampton LLP

(57) ABSTRACT

A video encoding method includes: dividing, based on a size of region, a plurality of quantization levels comprising a last non-zero quantization level within a block of a video into a plurality of regions in a level coding scan order to select a plurality of defined regions among the plurality of regions based on the last non-zero quantization level; generating, based on the quantization levels within the plurality of defined regions in a predefined scan order, a plurality of syntax structures associated with the plurality of defined regions; and encoding the plurality of syntax structures associated with the plurality of defined regions into a bitstream.

18 Claims, 6 Drawing Sheets

(51) Int. Cl.
    *H04N 19/119*     (2014.01)
    *H04N 19/169*     (2014.01)

(58) Field of Classification Search
    CPC .. H04N 19/167; H04N 19/18; H04N 19/1883;
                                      H04N 19/70
    USPC ................................................... 375/240.26
    See application file for complete search history.

(56)                        References Cited

U.S. PATENT DOCUMENTS

| | | | |
|---|---|---|---|
| 2013/0003821 A1 | 1/2013 | Karczewicz et al. | |
| 2013/0083857 A1* | 4/2013 | Zheng ................... | H04N 19/176 |
| | | | 375/240.18 |
| 2020/0396488 A1* | 12/2020 | Koo ........................ | H04N 19/18 |
| 2021/0160484 A1* | 5/2021 | Misra ................... | H04N 19/126 |
| 2021/0250586 A1 | 8/2021 | Sole Rojals et al. | |
| 2022/0078432 A1* | 3/2022 | Choi ..................... | H04N 19/176 |
| 2022/0345706 A1* | 10/2022 | Wang ..................... | H04N 19/93 |
| 2024/0244207 A1* | 7/2024 | He ........................ | H04N 19/176 |
| 2024/0291986 A1* | 8/2024 | Naser ..................... | H04N 19/18 |
| 2024/0406398 A1* | 12/2024 | Lim ....................... | H04N 19/91 |

OTHER PUBLICATIONS

Nalci et al., "Forward skip coding for prediction residuals", CWG-C002-v2, dated Jan. 26, 2022, 16 pages.
WIPO, International Search Report and Written Opinion for International Application No. PCT/US2023/024324 mailed on Sep. 1, 2023, 18 pages.

* cited by examiner

100 —

CTU

128X128

200

210

64X64

300

|  0 | 1 | 5 | 6 | 14 | 15 | 27 | 28 |
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

Figure 4:
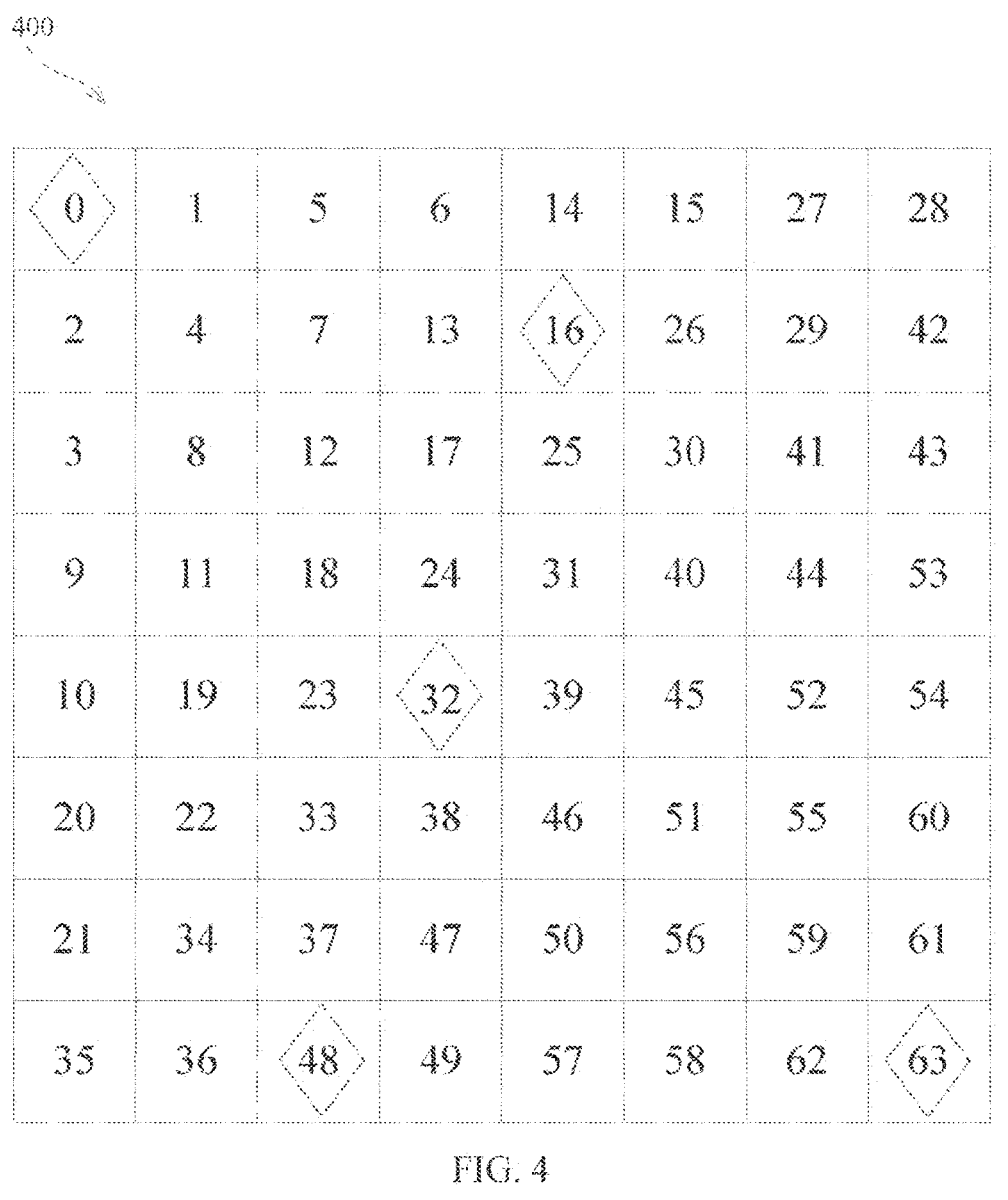

400

| 0  | 1  | 5  | 6  | 14 | 15 | 27 | 28 |
|----|----|----|----|----|----|----|----|
| 2  | 4  | 7  | 13 | 16 | 26 | 29 | 42 |
| 3  | 8  | 12 | 17 | 25 | 30 | 41 | 43 |
| 9  | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

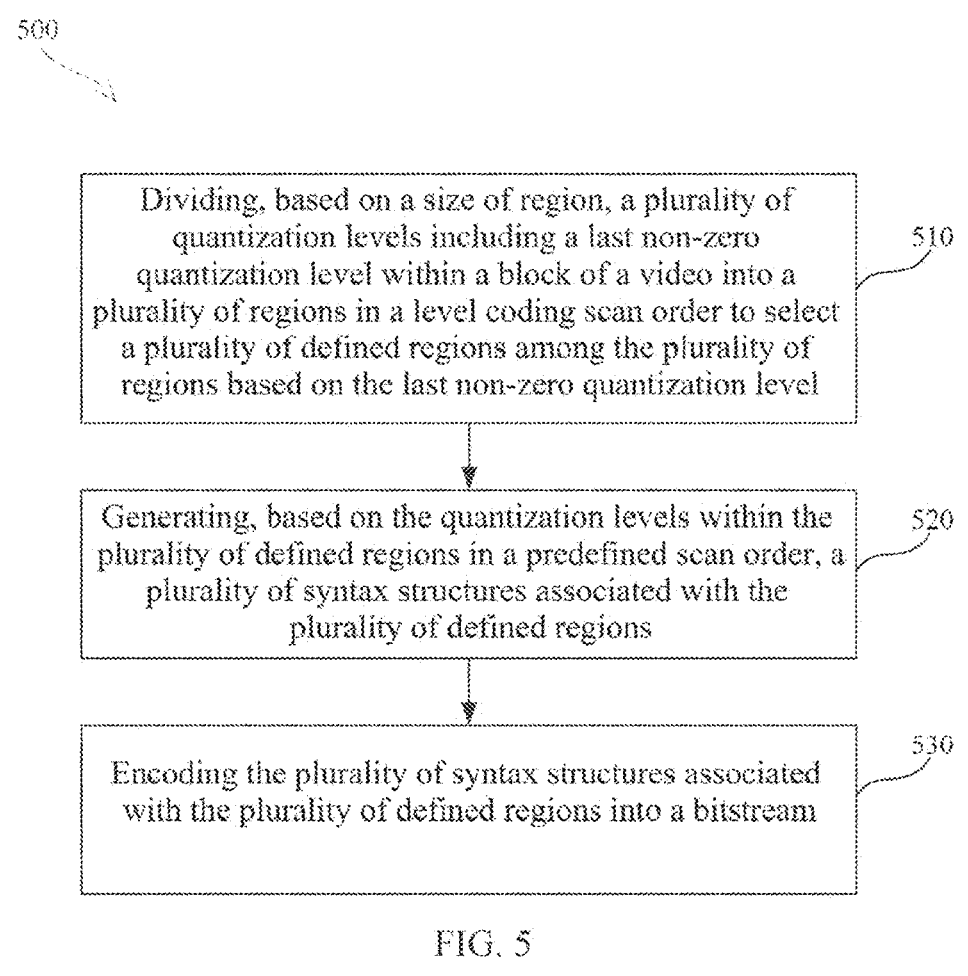

Dividing, based on a size of region, a plurality of quantization levels including a last non-zero quantization level within a block of a video into a plurality of regions in a level coding scan order to select a plurality of defined regions among the plurality of regions based on the last non-zero quantization level — 510

Generating, based on the quantization levels within the plurality of defined regions in a predefined scan order, a plurality of syntax structures associated with the plurality of defined regions — 520

Encoding the plurality of syntax structures associated with the plurality of defined regions into a bitstream — 530

FIG. 5

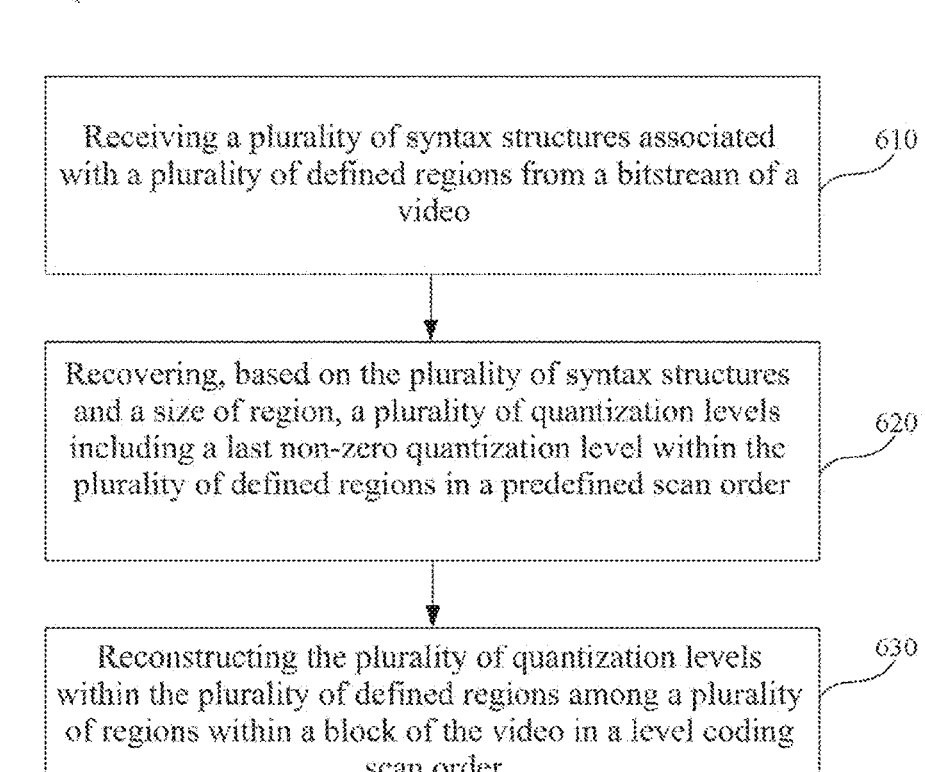

600

Receiving a plurality of syntax structures associated with a plurality of defined regions from a bitstream of a video

610

Recovering, based on the plurality of syntax structures and a size of region, a plurality of quantization levels including a last non-zero quantization level within the plurality of defined regions in a predefined scan order

620

Reconstructing the plurality of quantization levels within the plurality of defined regions among a plurality of regions within a block of the video in a level coding scan order

VIDEO ENCODING METHOD, VIDEO DECODING METHOD, NON-TRANSITORY COMPUTER-READABLE MEDIUM

CROSS-REFERENCE TO RELATED APPLICATIONS

This application is National Stage of International Application No. PCT/US2023/024324, filed on Jun. 2, 2023, which claims priority to U.S. Provisional Application No. 63/365,761, entitled "REGION-BASED COEFFICIENT CODING FOR AVM," filed on Jun. 2, 2022, which are hereby incorporated in their entireties by reference.

BACKGROUND OF DISCLOSURE

Field of the Disclosure

The present disclosure relates generally to computer-implemented methods and systems for video processing, and more particularly, to a video encoding method, a video decoding method, and a non-transitory computer-readable medium.

Description of the Related Art

Video coding has been used in a wide range of applications. For example, video coding formats are designed for streaming over the Internet, in which residual coding is used for coding all quantization levels after EOB (end of block) in a reverse scan order or all quantization levels in a forward scan order even there are consecutive zero quantization levels between non-zero quantization levels in a block. Thus, there is a need for video coding improvement.

SUMMARY

In a first aspect of the present disclosure, a video encoding method includes: dividing, based on a size of region, a plurality of quantization levels comprising a last non-zero quantization level within a block of a video into a plurality of regions in a level coding scan order to select a plurality of defined regions among the plurality of regions based on the last non-zero quantization level; generating, based on the quantization levels within the plurality of defined regions in a predefined scan order, a plurality of syntax structures associated with the plurality of defined regions; and encoding the plurality of syntax structures associated with the plurality of defined regions into a bitstream.

In a second aspect of the present disclosure, a video decoding method includes: receiving a plurality of syntax structures associated with a plurality of defined regions from a bitstream of a video; recovering, based on the plurality of syntax structures and a size of region, a plurality of quantization levels comprising a last non-zero quantization level within the plurality of defined regions in a predefined scan order; and reconstructing the plurality of quantization levels within the plurality of defined regions among a plurality of regions within a block of the video in a level coding scan order.

In a third aspect of the present disclosure, a non-transitory computer-readable medium having program code stored thereon, the program code executable by a processor to execute the video decoding method in the second aspect.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 4 is a schematic diagram illustrating an example of an eight-by-eight residual coding block for forward skip coding (FSC) that can be applied to embodiments of the present disclosure.

FIG. 5 is a flowchart illustrating a video encoding method according to an embodiment of the present disclosure.

FIG. 6 is a flowchart illustrating a video decoding method according to an embodiment of the present disclosure.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Video coding has been used in a wide range of applications, such as digital television (TV) broadcast, video transmission over the Internet and mobile networks, and real-time applications. For example, video coding formats are designed for streaming over the Internet, in which residual coding is used to code all quantization levels (i.e., quantized coefficients, also called levels or coefficients or quantized transform coefficients, herein) after an end of block (EOB) in a reverse scan order or all quantization levels in a forward scan order even there are consecutive zero quantization levels between non-zero quantization levels in a block. Thus, there is a need for video coding improvement.

In the present disclosure, coding is referred to mean encoding and decoding methods and systems.

For example, in the present disclosure, a region-based residual coding is provided to improve the coding performance for video coding like "Alliance for Open Media" (AVM) video coding such as "AOM Compression standard" (AV1) or "AOM Enhanced Compression Model" (AV2).

Figures 1, 2:
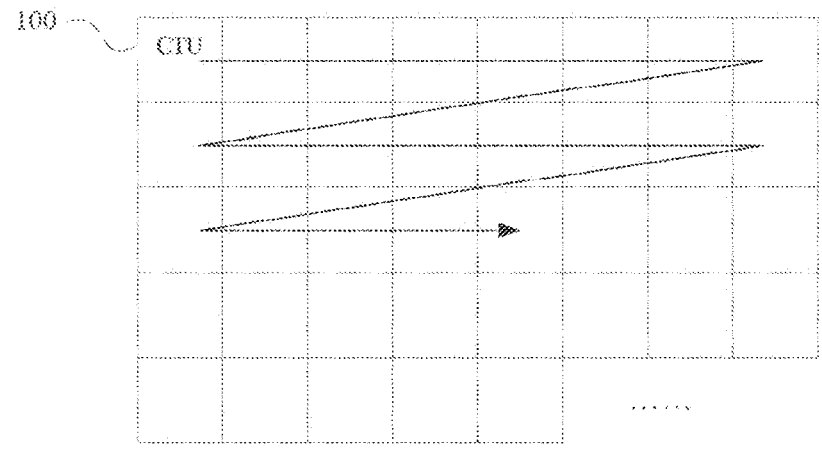
FIG. 1 is a schematic diagram illustrating a picture divided into superblocks that can be applied to embodiments of the present disclosure.
FIG. 2 is a schematic diagram illustrating a superblock divided into coding units (CUs) that can be applied to embodiments of the present disclosure.

Similar to other video coding schemes like "High Efficiency Video Coding" (HEVC), AV1 or AV2 is also built upon a block-based hybrid spatial and temporal predictive coding architecture. During coding, an input picture is first divided into blocks such as superblocks or coding tree units (CTUs) 100, as shown in FIG. 1. For example, the superblocks 100 can be blocks of 128×128 pixels.

As shown in FIG. 2, each of superblocks 200 such as 128×128 pixels in a picture can be partitioned into one or more coding units (CUs) 210 such as 64×64 pixels, which can be used for prediction and transformation. In addition, one of CUs can further be partitioned in a recursive manner, marked as "R" shown in FIG. 2. For example, AV1 can employ many coding tools and the details of these tools are described and specified in references such as "AV1 Bit-stream & Decoding Process Specification". January 2019; AV2 is developed upon AV1. Examples are illustrated below.

Residual Coding for Regular Transform (RCRT) Block in AVM Video Coding

For example, residual coding can be used to convert the quantization levels within a block into a bitstream in video coding. After quantization, there are N×M quantization levels for an N×M block. These N×M levels may be zero or non-zero values. Some zero levels and all non-zero quantization levels will further be coded with an M-ray symbol arithmetic coding for AV1. A predefined scan order which depends on the transform kernel is used to convert two-dimensional (2-D) levels into a one-dimensional (1-D) array for sequential processing.

For example, a column scan can be used for 1-D vertical transform; a row scan can be used for 1-D horizontal transform; a zig-zag scan can be used for both 2-D transform and identity matrix (IDTX).

For example, in an AVM residual coding scenario, one syntax element such as a flag "all_zero" can be coded first to indicate if all quantization levels in the current block are zero or not. If all the quantization levels are zero, no more syntax elements will be coded. If not all of the quantization levels in a block are zero, several more syntax elements will be coded in the bitstream to describe the end of the block (EOB, i.e., a last non-zero quantization level in an inter block), and all the quantization levels as well as the signs of non-zero quantization levels before the end of the block. For the luma component, the transform type will also be coded depending on the block type (such as intra or inter blocks). After a position index of the last non-zero quantization level in a predefined scan order (such as the zig-zag scan in the order of position indices 0, 1, 2, 3, . . . , 60, 61, 62, 63 within block 300, shown in FIG. 3) is coded, all the quantization levels before the last non-zero quantization level are then processed in a reverse scan order (such as the zig-zag scan in the order of position indices 63, 62, 61, 60, . . . 3, 2, 1, 0 within block 300, shown in FIG. 3). For example, for each individual quantization level, such as shown in AV2, the quantization level can be decomposed into four symbols as follows:

(1) Sign bit: when it is 1, the quantization level is negative; otherwise, the quantization level is positive.

(2) Base range (BR): this symbol is defined with 4 possible outcomes $\{0, 1, 2, >2\}$, which are the absolute values of the quantization levels. An exception is for the last non-zero quantization level, where $BR \in \{1, 2, >2\}$, since 0 has been ruled out.

(3) Low range (LR): this symbol is defined with 4 possible outcomes $\{0, 1, 2, >2\}$ that correspond to the level value over the previous symbol's upper limit.

(4) High range (HR): This symbol has a range of $[0, 2^{15}]$ that corresponds to the residual value over the previous symbols' upper limit.

For example, for coding a level V, one first processes an absolute value of the level V. If $|V| \in [0, 2]$, the BR symbol is sufficient to signal the level V and the coding of $|V|$ is terminated. Otherwise, the outcome of the BR symbol will be ">2" (more than two), and a first LR symbol is used to signal $|V|$. If $|V| \in [3, 5]$, this LR symbol will be able to code the value of $|V|$ and complete the coding. If not, a second LR symbol is used to further code $|V|$. The process of the LR symbol can be repeated up to 4 times, which effectively covers the range $[3, 14]$ of $|V|$. If $|V| > 14$, an HR symbol is coded to signal residual value $(|V| - 14)$.

For example, a probability model of the BR symbol can be conditioned by using the previously coded levels in the same transform block. Because a quantization level can have correlations with multiple neighboring samples, a set of spatial nearest neighbors are used to update the probability model for the current position. For 1-D transform kernels, three coefficients are used after the current sample along the transform direction. For 2-D transform kernels, up to five neighboring coefficients in the immediate right-bottom region are used. In both cases, the absolute values of the reference levels are added up and the sum is considered as the context for the probability model of the BR symbol.

Similarly, a probability model of the LR symbol is updated by using three reference coefficients for 1D transform kernels, and the reference region for 2-D transform kernels is reduced to the nearest three coefficients.

For example, the HR symbol can be binarized using a binarization method such as the Exp-Golomb code and then coded without context updating. The sign bit is only needed for non-zero quantized transform coefficients and it is coded without context updating. In is understandable that a DC coefficient refers to a transform coefficient whose frequency indices are zero in both dimensions, and an AC coefficient refers to any transform coefficient whose frequency indices are non-zero in at least one dimension. To improve hardware throughput, all the sign bits of AC levels (derived from AC coefficients) within a transform block are packed together for transmission in the bitstream, which allows a chunk of data to bypass the context updating process in the entropy coding in hardware decoders. On the other hand, the sign bit of the DC coefficient is entropy coded using a probability model conditioned by using the sign bits of the DC coefficients in the above and left transform blocks.

Forward Skip Coding (FSC) Block in AVM Video Coding

For example, in contrast to RCRT (such as being associated with AV1), forward skip coding (FSC) (such as being associated with AV2) uses another residual coding method for the quantization levels, such as several non-zero quantization levels including a last non-zero quantization level (i.e., EOB) in an intra block, obtained after the 2D identity transform (IDTX) and quantization.

For example, for intra blocks, FSC is signaled at the coding block (CB) level and it disables the CB level syntax elements associated with tools such as multiple reference line (MRL) prediction, filter intra mode, and angle delta prediction. These tools are inferred to be off when the FSC mode is selected. When the FSC mode is enabled, the IDTX transform type is signaled at the CB level and is no longer coded at the transform block (TB) level.

For example, for inter blocks, IDTX syntax signaling is unchanged and remains the same in the current AVM design. However, FSC residual coding can still be selected for inter TBs based on a signaled transform type and the "allow_screen_content_tools" flag. Furthermore, FSC is only applied to luma samples in order to minimize the number of associated context models and therefore to reduce the complexity based on a coding-gain complexity trade-off.

For example, FSC reuses most parts of the RCRT in AVM, and no modifications are made for the BR. LR and HR range definitions, wherein BR, LR, and HR also use the coding method in RCRT. However, FSC uses a forward scan order (such as the zig-zag scan in the order of position indices 0, 1, 2, 3, . . . , 60, 61, 62, 63 within block 400, shown in FIG. 4) when coding the residual level samples, which starts coding from the top-left position (0, 0) and proceeds to the last position located at the bottom-right corner of a block in scan order. Moreover, EOB is no longer needed in the FSC.

For example, in embodiments of the present disclosure, a level coding scan order such as the zig-zag scan in the order of position indices 0, 1, 2, 3, . . . 60, 61, 62, 63 is applied to divide a plurality of quantization levels within a block into a plurality of region; and a plurality of defined regions among the plurality of region are selected for coding in a predefined scan order such as a forward scan order or a reverse scan order.

For example, a last non-zero quantization level, such as a last quantization level in a block for FSC or EOB in a block for RCRT, is used to select the plurality of defined regions among the plurality of regions divided within the block for coding at least a part of the block, such as quantization levels in the plurality of defined regions in the predefined scan order such as a forward scan order for FSC or a reverse scan order for RCRT.

For example, the plurality of defined regions include the regions having the last non-zero quantization level or other quantization levels in the level coding scan order before the last non-zero quantization level, e.g., the level coding scan order is a zig-zag scan order from a top-left position (i.e., a first position index in the level coding scan order) to a bottom-right position (i.e., a position index of the last non-zero quantization level) of the block.

In the present disclosure, a video encoding method is provided for region-based coefficient coding, examples are provided as below.

For example, a flowchart illustrating a video encoding method according to an embodiment of the present disclosure is shown in FIG. 5, in which an example of a video encoding method 500 is provided. The video encoding method 500 includes: a box 510, dividing, based on a size of region, a plurality of quantization levels level including a last non-zero quantization level within a block of a video into a plurality of regions in a level coding scan order to select a plurality of defined regions among the plurality of regions based on the last non-zero quantization level; a box 520, generating, based on the quantization levels within the plurality of defined regions in a predefined scan order, a plurality of syntax structures associated with the plurality of defined regions; and a box 530, encoding the plurality of syntax structures associated with the plurality of defined regions into a bitstream of the video.

Correspondingly, a video decoding method is provided for region-based coefficient coding, examples are provided as below.

For example, a flowchart illustrating a video decoding method according to an embodiment of the present disclosure is shown in FIG. 6, in which an example of a video decoding method 600 is provided. The video decoding method 600 includes: a box 610, receiving a plurality of syntax structures associated with a plurality of defined regions from a bitstream of a video; a box 620, recovering, based on the plurality of syntax structures and a size of region, a plurality of quantization levels comprising a last non-zero quantization level within the plurality of defined regions in a predefined scan order; and a box 630, reconstructing the plurality of quantization levels within the plurality of defined regions among a plurality of regions within a block of the video in a level coding scan order.

It should be noted that, in the present disclosure, the video encoding/decoding method can be used for residual coding and will code all quantization levels after EOB (i.e., a last non-zero quantization level) for RCRT in reverse scan order or all quantization levels (such as non-zero quantization levels including a last non-zero quantization level) for FSC in the predefined scan order, in which there are consecutive zero quantization levels between non-zero quantization levels distributed within the regions. Understandably, the present disclosure provides region-based residual coding for both RCRT and FSC, in which a number of the regions divided within a block and a number of the defined regions selected from the regions may be equal or different depending on whether the last non-zero quantization level is located within the last region in the level coding scan order.

In some embodiments, as illustrated by the video encoding method 500 shown in FIG. 5, in the box 510, the dividing, based on the size of region, the plurality of quantization levels level including the last non-zero quantization level within the block of the video into the plurality of regions in the level coding scan order to select a plurality of defined regions among the plurality of regions based on the last non-zero quantization level includes: calculating a number of the regions within the block according to the size of region and a number of the quantization levels within the block; in response to determining that the predefined scan order is a forward scan order from a first position index within the block to a position index of the last non-zero quantization level within the block, calculating that a number of the defined regions is equal to a number of the regions; and in response to determining that the predefined scan order is a reverse scan order from the position index of the last non-zero quantization level within the block to the first position index within the block, calculating a number of the defined regions according to the size of region and a position index of the last non-zero quantization level within the block, wherein the number of the defined regions is less than or equal to the number of the regions within the block. Correspondingly, a decoding process corresponds to the above encoding process is provided as below.

In some embodiments, as illustrated by the video decoding method 600 shown in FIG. 6, in the box 630, the reconstructing the plurality of quantization levels within the plurality of defined regions among the plurality of regions within the block of the video in the level coding scan order includes: calculating a number of the regions within the block according to the size of region and a number of the quantization levels within the block; in response to determining that the predefined scan order is a forward scan order from a first position index within the block to a position index of the last non-zero quantization level within the block, calculating that a number of the defined regions is equal to a number of the regions; and in response to determining that the predefined scan order is a reverse scan order from the position index of the last non-zero quantization level within the block to the first position index within the block, calculating a number of the defined regions according to the size of region and a position index of the last non-zero quantization level within the block, wherein the number of the defined regions is less than or equal to the number of the regions within the block. The examples are provided as below.

For example, for an N×M block, a size of region is set to be K. The N×M block is partitioned into L regions along a scan order (such as a level coding scan order) starting from the top-left corner (0, 0) position in the block, and L is calculated as follows.

$$L = (((N \times M) \bmod K) \neq 0)?\ floor(N \times M/K) + 1 : (N \times M/K) \qquad (1)$$

In the above formula (1), (X mod Y) represents a function that outputs a remainder after dividing X by Y; floor (X) is a function that takes as input a real number X, and gives as output the greatest integer less than or equal to X.

For example, quantization levels within the current block are provided for coding region by region in either reverse scan order or forward scan order, depending on if it is processed in RCRT or FSC. Moreover, a syntax element such as a region coding flag "region_flag" for each coded region (also called as defined region) is provided to indicate if the current region has all zero quantization levels or not. If this syntax element is equal to 1 (i.e., a first state), the current region has all zero levels, and there is no need to code each individual zero level within this region except for some special cases such as specified below. If this syntax element is equal to 0 (i.e., a second state), the current region has at least one non-zero quantization level and all the quantization levels within this region will be coded one by one either using RCRT or FSC.

Figure 3:
FIG. 3 is a schematic diagram illustrating an example of an eight-by-eight residual coding block for residual coding for regular transform (RCRT) that can be applied to embodiments of the present disclosure.

As one example shown in FIG. 3, the block size is 8×8, and the size of region K is set at 16. Hence there will be four regions (L=4) for this block. It should be noted that a number of coded regions (also called as defined regions) P will be less than or equal to L. For RCRT, depending on the location of EOB (e.g., a position index of the last non-zero quantization level within an inter block in the level coding scan order such as a forward scan order), e.g., P is calculated as follows.

$$P = ((T(EOB) \bmod K) \neq 0)? floor(T(EOB)/K) + 1 : (T(EOB)/K) \quad (2)$$

In the above formula (2), "T(EOB)" represents the position index of the EOB in the level coding scan order such as a forward scan order within a block such as the superblock or its derivatives; the position indices in the level coding scan order within a single block may be for example, but is not limited to, 0, 1, 2, 3 . . . 61, 62, and 63 in a scan order starting at a top-left corner such as coordinates (0,0) of a block and ending at a right-bottom corner such as coordinates (N−1, M−1) of the block, such as zig-zag scan.

For example, as shown in FIG. 3, for RCRT, if the T (EOB) is a position index as indexed to "56", there will be four coded regions that each of coded regions may be coded with a region_flag, such region_flag[i], i=0, 1, 2, and 3. Positions as indexed form "56" to "48" (i.e., nine positions in total) are the first coded region; positions as indexed form "47" to "32" (i.e., sixteen positions in total) are the second coded region; positions as indexed form "31" to "16" (i.e., sixteen positions in total) are the third coded region; and positions as indexed form "15" to "0" (i.e., sixteen positions in total) are the fourth coded region, in this case, P=L.

As another example shown in FIG. 3, for RCRT, if the T (EOB) is a position index as indexed to "40", there will be three coded regions that each may be coded with a region_flag. Positions as indexed form "40" to "32" (i.e., nine positions in total) are the first coded region; positions as indexed form "31" to "16" (i.e., sixteen positions in total) are the second coded region; and positions as indexed form "15" to "0" (i.e., sixteen positions in total) are the third coded region, in this case, P<L.

In addition, for RCRT, the last non-zero quantization level (i.e., EOB) is a starting position in the reverse scan order, the defined regions including the quantization levels associated with position indices from T (EOB) (such as "40" or "56") to "0" in the reverse scan order (shown in FIG. 3) will be processed, region by region; and for FSC, the last non-zero quantization level (i.e., the last quantization level in a block) is a terminal position in the forward scan order, the defined regions including the quantization levels from associated with position indices from "0" to "63" in the forward scan order (shown in FIG. 4) will be processed, region by region. Further, naming of regions is provided to index the first and last region in different scan order for FSC and RCRT, such as a first-forward defined region and a last-forward defined region used for the forward scan order, and a first-reverse defined region and a last-reverse defined region used for the reverse scan order.

In some embodiments, as illustrated by the video encoding method 500 shown in FIG. 5, in the box 520, the generating, based on the quantization levels within the plurality of defined regions in the predefined scan order, the plurality of syntax structures associated with the plurality of defined regions includes: in response to determining that the predefined scan order is a forward scan order from a first position index within the block to a position index of the last non-zero quantization level within the block, generating the plurality of syntax structures based on the quantization levels within the plurality of defined regions from a first-forward defined region associated with the first position index to a last-forward defined region associated with a position index of the last non-zero quantization level, region by region; and in response to determining that the predefined scan order is a reverse scan order from the position index of the last non-zero quantization level within the block to the first position index within the block, generating the plurality of syntax structures based on the quantization levels within the plurality of defined regions from a first-reverse defined region associated with the position index of the last non-zero quantization level to a last-reverse defined region associated with the first position index, region by region. Correspondingly, a decoding process corresponds to the above encoding process is provided as below.

In some embodiments, as illustrated by the video decoding method 600 shown in FIG. 6, in the box 620, the recovering, based on the plurality of syntax structures and the size of region, the plurality of quantization levels comprising the last non-zero quantization level within the plurality of defined regions in the predefined scan order includes: in response to determining that the predefined scan order is a forward scan order from a first position index within the block to a position index of the last non-zero quantization level within the block, recovering the quantization levels within the plurality of defined regions from a first-forward defined region associated with the first position index to a last-forward defined region associated with a position index of the last non-zero quantization level, region by region; and in response to determining that the predefined scan order is a reverse scan order from the position index of the last non-zero quantization level within the block to the first position index within the block, recovering the quantization levels within the plurality of defined regions from a first-reverse defined region associated with the position index of the last non-zero quantization level within the block to a last-reverse defined region associated with the first position index, region by region. The examples are provided as below.

For example, for RCRT, a defined region such as region [0] is defined as the first coded region which includes the EOB and the corresponding syntax element such as a region coding flag is region_flag[0]; another defined region such as region[P−1] is the last coded region which includes a position index (0,0) and the corresponding syntax element such as region coding flag is region_flag[P−1].

For example, as shown in FIG. 4, for FSC, the coding starts from the top-left corner position index (0, 0) such as indexed to "0" of a block and proceed to the last position index at the bottom-right corner as (N−1, M−1) such as indexed to "63" along the forward scan order. The number of coded regions will be equal to L for FSC because all position indices will be coded. For example, for FSC, region[0] is the first coded region which includes a first position index (0, 0), and region[L−1] is the last coded region that includes a last position index (N−1, M−1) along the forward scan order. For example, Positions as indexed form "0" to "15" (i.e., sixteen positions in total) are the first coded region; positions as indexed form "16" to "31" (i.e., sixteen positions in total) are the second coded region; positions as indexed form "32" to "47" (i.e., sixteen positions in total) are the third coded region; and positions as indexed form "48" to "63" (i.e., sixteen positions in total) are the fourth coded region. Similarly, each coded regions may be coded with one coded region_flag[i] wherein i is a variable number between 0 and L−1.

As above discussion, a plurality of syntax elements such as coded region_flag[i] (between 0 and L−1) are used to indicate whether all of the quantization levels within a respective defined region or the quantization levels within the respective defined region other than the last non-zero quantization level are equal to zero. If the case of all of the quantization levels within a respective defined region or the quantization levels within the respective defined region other than the last non-zero quantization level equal to zero, a respective region syntax structure associated with the respective defined region uses a respective syntax element replacing consecutive zero quantization levels within the respective defined region, and the quantization levels and the last non-zero quantization level are used in different cases, thereby improving video compression coding efficiency.

In some embodiments, as illustrated by the video encoding method 500 shown in FIG. 5, in the box 520, the generating, based on the quantization levels within the plurality of defined regions in the predefined scan order, the plurality of syntax structures associated with the plurality of defined regions includes: generating a plurality of syntax elements associated with the plurality of defined regions based on the quantization levels within the plurality of defined regions and the last non-zero quantization level; and generating the plurality of syntax structures based on the plurality of syntax elements, the quantization levels within the plurality of defined regions, and the last non-zero quantization level.

In some embodiments, as illustrated by the video encoding method 500 shown in FIG. 5, in the box 520, the generating, based on the quantization levels within the plurality of defined regions in the predefined scan order, the plurality of syntax structures associated with the plurality of defined regions includes: determining whether all of the quantization levels within a respective defined region or the quantization levels within the respective defined region other than the last non-zero quantization level are equal to zero; and generating, based on a determination of whether all of the quantization levels within the respective defined region or the quantization levels within the respective defined region other than the last non-zero quantization level are equal to zero, a respective syntax element of the plurality of syntax elements.

For example, a respective region syntax structure associated with the respective defined region includes one of elements including: the respective syntax element; the quantization levels within the respective defined region; a combination of the respective syntax element and the last non-zero quantization level; and a combination of the respective syntax element and the quantization levels within the respective defined region.

In addition, the specific examples (such as Examples 1 to 7 discussed as below) given in the present disclosure can be applied for region-based video coding (e.g., AVM video coding), such as AV1 or AV2, but the present disclosure is not limited thereto.

In some embodiments, as illustrated by the video encoding method 500 shown in FIG. 5, in the box 520, the generating, based on the quantization levels within the plurality of defined regions in the predefined scan order, the plurality of syntax structures associated with the plurality of defined regions includes: in response to determining the predefined scan order is a reverse scan order from the position index of the last non-zero quantization level within the block to the first position index within the block, generating a respective region syntax structure of the plurality of syntax structures based on the quantization levels of a respective defined region of the plurality of defined regions in the reverse scan order. Correspondingly, a decoding process corresponds to the above encoding process is provided as below.

In some embodiments, as illustrated by the video decoding method 600 shown in FIG. 6, in the box 620, the recovering, based on the plurality of syntax structures and the size of region, the plurality of quantization levels comprising the last non-zero quantization level within the plurality of defined regions in the predefined scan order includes: in response to determining the predefined scan order is a reverse scan order from the position index of the last non-zero quantization level within the block to the first position index within the block, recovering the quantization levels of a respective defined region of the plurality of defined regions from a respective region syntax structure of the plurality of syntax structures in the reverse scan order.

In addition, in the present disclosure, although the syntax element being a first state ("1") can be used to indicate all quantization levels in a region are zero, because the EOB for RCRT is a last non-zero quantization, if a special region involves the EOB for RCRT and there the quantization levels other than EOB within the special region are zero, in this case, the syntax element can be also assign to the first state ("1") for improving video compression coding efficiency.

In some embodiments, as illustrated by the video encoding method 500 shown in FIG. 5, in the box 520, the generating, based on the quantization levels within the plurality of defined regions in the predefined scan order, the plurality of syntax structures associated with the plurality of defined regions includes: in response to determining that the predefined scan order is the reverse scan order and that all of the quantization levels other than the last non-zero quantization level within a first-reverse defined region in the reverse scan order are equal to zero, generating a respective region syntax structure based on a respective syntax element associated with the first-reverse defined region and the last non-zero quantization level within the first-reverse defined region, wherein the syntax element associated with the first-reverse defined region is determined as in a first state; and in response to determining that the predefined scan order is the reverse scan order and that not all of the quantization levels other than the last non-zero quantization level within the first-reverse defined region are equal to zero, generating the respective region syntax structure based on the respective syntax element associated with the first-reverse defined region and all of the quantization levels within the first-reverse defined region in the reverse scan order, wherein the syntax element associated with the first-reverse defined region is determined as in a second state. Correspondingly, a decoding process corresponds to the above encoding process is provided as below.

In some embodiments, as illustrated by the video decoding method 600 shown in FIG. 6, in the box 620, the recovering, based on the plurality of syntax structures and the size of region, the plurality of quantization levels comprising the last non-zero quantization level within the plurality of defined regions in the predefined scan order comprises: in response to determining that the predefined scan order is the reverse scan order and that a respective syntax element associated with the first-reverse defined region in the reverse scan order is determined as in a first state, recovering the plurality of quantization levels within a respective defined region based on the last non-zero quantization level within the first-reverse defined region from a respective region syntax structure and all of the quantization levels other than the last non-zero quantization level within the first-reverse defined region as equal to zero based on the size of region; and in response to determining that the predefined scan order is the reverse scan order and that the respective syntax element associated with the first-reverse defined region is determined as in a second state, recovering the plurality of quantization levels within the respective defined region based on all of the quantization levels within the first-reverse defined region from the respective region syntax structure in the reverse scan order. The example is provided as below.

Example 1

For RCRT, all syntax element, such as region_flag[i], wherein i is an integer between 0 and (P–1) will be coded into a bitstream. Except for region_flag[0], the region_flag[i] equal to 1 (i.e., a first state) means that all the quantization levels within the i-th region[i] are zero, and there is no need to code each of quantization levels within this region. The region_flag[i] equal to 0 (i.e., a second state) means that there is at least one non-zero quantization level within the i-th region[i] and each of quantization levels will be coded in reverse scan order according to a level coding method such as specified in the AVM. For the region[0], which includes the EOB, the region_flag[0] equal to 1 means that all the quantization levels within region[0] are zero except the EOB, and there is no need to code each of quantization levels within this region except the EOB, region_flag[0] equal to 0 means that there is at least one non-zero quantization level within region[0] besides the EOB, therefore all the quantization levels within region[0] will be coded in reserve scan order according to the level coding method specified in the AVM.

Further, in the present disclosure, if some cases occur frequently, then related information can be bypassed for coding to improve coding efficiency. For example, if some defined regions for RCRT are frequently in a case of not all zero quantization levels, then all quantization levels within those defined regions are coded into bitstream one by one in the reverse scan order, while the syntax elements for those defined regions may be bypassed to coded into bitstream for improving video compression coding efficiency.

In some embodiments, as illustrated by the video encoding method 500 shown in FIG. 5, in the box 520, the generating, based on the quantization levels within the plurality of defined regions in the predefined scan order, the plurality of syntax structures associated with the plurality of defined regions includes: in response to determining that the predefined scan order is the reverse scan order and that not all of the quantization levels within a specified region as the first-reverse defined region or the last-reverse defined region or each of the first-reverse defined region and the last-reverse defined region are equal to zero, generating a respective region syntax structure based on all of the quantization levels within the specified region in the reverse scan order, wherein a respective syntax element associated with the specified region is predefined as in a second state; and in response to determining that the predefined scan order is the reverse scan order and that all of the quantization levels within the specified region are equal to zero, generating the respective region syntax structure based on the respective syntax element associated with the specified region, wherein the respective syntax element associated with the specified region is determined as in a first state. Correspondingly, a decoding process corresponds to the above encoding process is provided as below.

In some embodiments, as illustrated by the video decoding method 600 shown in FIG. 6, in the box 620, the recovering, based on the plurality of syntax structures and the size of region, the plurality of quantization levels including the last non-zero quantization level within the plurality of defined regions in the predefined scan order includes: in response to determining that the predefined scan order is the reverse scan order and that a respective syntax element associated with a specified region as the first-reverse defined region or the last-reverse defined region or each of the first-reverse defined region and the last-reverse defined region does not be found from a respective region syntax structure and is predefined as in a second state, recovering all of the quantization levels within the specified region from the respective region syntax structure in the reverse scan order; and in response to determining that the predefined scan order is the reverse scan order and that the respective syntax element associated with the specified region is determined as in a first state, recovering all of the quantization levels within the specified region as equal to zero based on the size of region. The examples are provided below.

Example 2

For RCRT, a syntax element of the first-reverse defined region, such as the region_flag[0] (i.e., a syntax element for the first-reverse defined region), may not be coded into the bitstream, e.g., the region_flag[0] is bypassed to be coded into the bitstream, and the value of region_flag[0] is inferred to be equal to 0 (i.e., a second state). All the quantization levels within region[0] will be coded into the bitstream according to the level coding method specified in the AVM, e.g., generating a region syntax structure for region[0] based on all of the quantization levels within the specified region in the reverse scan order to be coded into the bitstream. On the other hand, all other region_flag[i] s wherein i is a number between 1 and (P–1) will be coded into the bitstream to indicate whether the corresponding region has all zero levels or not. region_flag[i] equal to 1 (i.e., a first state) means that all the quantization levels within the i-th region [i] are zero, and there is no need to code each individual level within this region. region_flag[i] equal to 0 (i.e., a second state) means that there is at least one non-zero quantization level within the i-th region[i] and each individual level will be coded in reverse scan order according to the level coding method specified in the AVM.

Example 3

For RCRT, the region_flag[P−1] (i.e., a syntax element for the last-reverse defined region) may not be coded into the bitstream, e.g., the region_flag[P−1] is bypassed to be coded into the bitstream, and the value of region_flag[P−1] is inferred to be equal to 0. All the quantization levels within region[P−1] will be coded into bitstream according to the level coding method specified in the AVM.

Example 4

For RCRT, both region_flag[0] and region_flag[P−1] (i.e., syntax elements for the first-reverse defined region and the last-reverse defined region) may not be coded into the bitstream, e.g., each of region_flag[0] and region_flag[P−1] is bypassed to be coded into the bitstream, and both syntax elements are inferred to be equal to 0. All the quantization levels within region[0] and region[P−1] will be coded into the bitstream according to the level coding method specified in AV2. All other region_flag[i] s wherein i is a number between 1 and (P−2) will be coded into the bitstream to indicate whether the corresponding region has all zero levels or not. region_flag[i] equal to 1 means that all the quantization levels within the i-th region[i] are zeros, and there is no need to code each individual level within this region. region_flag[i] equal to 0 means that there is at least one non-zero quantization level within the i-th region[i] and each individual level will be coded in reverse scan order according to level coding specified in the AVM.

In some embodiments, as illustrated by the video encoding method 500 shown in FIG. 5, in the box 520, the generating, based on the quantization levels within the plurality of defined regions in the predefined scan order, the plurality of syntax structures associated with the plurality of defined regions includes: in response to determining that the predefined scan order is the reverse scan order and that all of the quantization levels within each of the defined regions other than a specified region as the first-reverse defined region or the last-reverse defined region or each of the first-reverse defined region and the last-reverse defined region are equal to zero, generating a respective region syntax structure based on a respective syntax element associated with each of the defined regions other than the specified region, wherein the respective syntax element associated with each of the defined regions other than the specified region is determined as in a first state; and in response to determining that the predefined scan order is the reverse scan order and that not all of the quantization levels within each of the defined regions other than the specified region are equal to zero, generating the respective region syntax structure based on all of the quantization levels within each of the defined regions other than the specified region in the reverse scan order and the respective syntax element associated with each of the defined regions other than the specified region, wherein the respective syntax element associated with each of the defined regions other than the specified region is determined as in a second state. Correspondingly, a decoding process corresponds to the above encoding process is provided as below.

In some embodiments, as illustrated by the video decoding method 600 shown in FIG. 6, in the box 620, the recovering, based on the plurality of syntax structures and the size of region, the plurality of quantization levels including the last non-zero quantization level within the plurality of defined regions in the predefined scan order includes: in response to determining that the predefined scan order is the reverse scan order and that a respective syntax element associated with each of the defined regions other than a specified region as the first-reverse defined region or the last-reverse defined region or each of the first-reverse defined region and the last-reverse defined region is determined as in a first state, recovering all of the quantization levels within each of the defined regions other than the specified region as equal to zero based on the size of region; and in response to determining that the predefined scan order is the reverse scan order and that the respective syntax element associated with each of the defined regions other than the specified region is determined as in a second state, recovering all of the quantization levels within each of the defined regions other than the specified region from a respective region syntax structure in the reverse scan order.

Furthermore, in the present disclosure, if some cases occur frequently, then related information can be bypassed for coding to improve coding efficiency. For example, if the defined region for RCRT are frequently in a case of EOB near a region boundary (such as a position indexed as "48", shown in FIG. 3), then all quantization levels within those defined regions are coded into bitstream one by one in the reverse scan order, while the syntax elements for the defined region may be bypassed to be coded into bitstream for improving video compression coding efficiency.

In some embodiments, as illustrated by the video encoding method 500 shown in FIG. 5, in the box 520, the generating, based on the quantization levels within the plurality of defined regions in the predefined scan order, the plurality of syntax structures associated with the plurality of defined regions includes: in response to determining that the predefined scan order is the reverse scan order and that a difference between the position index associated with the last non-zero quantization level and a position index associated with a boundary position of the defined region next to the first-reverse defined region is less than a threshold, generating a respective region syntax structure based on all of the quantization levels within the first-reverse defined region, wherein a respective syntax element associated with the first-reverse defined region is predefined as in a second state. For example, the threshold can be set as three. Correspondingly, a decoding process corresponds to the above encoding process is provided as below.

In some embodiments, as illustrated by the video decoding method 600 shown in FIG. 6, in the box 620, the recovering, based on the plurality of syntax structures and the size of region, the plurality of quantization levels comprising the last non-zero quantization level within the plurality of defined regions in the predefined scan order includes: in response to determining that the predefined scan order is the reverse scan order and that a respective syntax element associated with the first-reverse defined region does not be found from a respective region syntax structure, recovering all of the quantization levels within the first-reverse defined region from the respective region syntax structure in the reverse scan order. The example is provided below.

Example 5

For RCRT, if a position index of the EOB is close enough to a position index of the next region boundary, e.g. (T(EOB) mod K)<threshold, e.g., the threshold is 3, the region_flag[0] is not coded and the value of region_flag[0] is inferred to be equal to 0, all the quantization levels within region[0] will be coded into the bitstream according to the level coding method specified in the AVM.

Moreover, in the present disclosure, because a position index of EOB for RCRT is not a last position index of a block, there is a specific defined region has fewer quantization levels than other regions, any one of the defined regions may be assigned to have the fewer quantization levels for improving video compression coding efficiency.

In some embodiments, as illustrated by the video encoding method 500 shown in FIG. 5, in the box 520, the generating, based on the quantization levels within the plurality of defined regions in the predefined scan order, the plurality of syntax structures associated with the plurality of defined regions includes: in response to determining that the predefined scan order is the reverse scan order and that a number of the quantization levels within one of the plurality of defined regions is less than the size of region, determining that a number of the quantization levels within the first-reverse defined region or the last-reverse defined region is less than the size of region. Correspondingly, a decoding process corresponds to the above encoding process is provided as below.

In some embodiments, as illustrated by the video decoding method 600 shown in FIG. 6, in the box 620, the recovering, based on the plurality of syntax structures and the size of region, the plurality of quantization levels comprising the last non-zero quantization level within the plurality of defined regions in the predefined scan order includes: in response to determining that the predefined scan order is the reverse scan order and that a number of the quantization levels within one of the plurality of defined regions is less than the size of region, determining that a number of the quantization levels within the first-reverse defined region or the last-reverse defined region is less than the size of region. The examples are provided below.

Example 6

For RCRT, an N×M block may be partitioned into P regions of size K starting from EOB and going back to the top-left corner (0, 0) position index in reverse scan order for RCRT, wherein P is calculated as formula (2).

For example, as shown in FIG. 3, for RCRT, if the EOB is in position as indexed to "56", there will be four coded regions. Positions as indexed form "56" to "41" (i.e., sixteen positions in total) is the first coded region; positions as indexed form "40" to "25" (i.e., sixteen positions in total) is the second coded region; positions as indexed form "24" to "9" (i.e., sixteen positions in total) is the third coded region; and positions as indexed form "8" to "0" (i.e., nine positions in total) is the fourth coded region.

As another example shown in FIG. 3, for RCRT, the EOB is in position as indexed to "40", and there will be three coded regions. Positions as indexed to "40" to "25" (i.e., sixteen positions in total) are the first coded region; positions as indexed to "24" to "9" (i.e., sixteen positions in total) are the second coded region, and positions as indexed to "8" to "0" (i.e., nine positions in total) are the third coded region. Examples 1, 2, 3, and 4 discussed above can be applied and combined with this partition method.

It is understandable that the provided region_flag[i] may be coded either in a bypass mode or a context adaptive mode. If they are coded as context-coded bins, the context model may be updated based upon the previous coded region_flags.

In addition, in the present disclosure, because all quantization levels in a region for FSC are important, all syntax elements are coded into bitstream other than a special case such as one or more non-zero quantization levels only within last defined region for FSC.

In some embodiments, as illustrated by the video encoding method 500 shown in FIG. 5, in the box 520, the generating, based on the quantization levels within the plurality of defined regions in the predefined scan order, the plurality of syntax structures associated with the plurality of defined regions includes: in response to determining that the predefined scan order is a forward scan order from a first position index within the block to a position index of the last non-zero quantization level within the block, generating a respective region syntax structure of the plurality of syntax structures based on the quantization levels of a respective defined region of the plurality of defined regions in the forward scan order. Correspondingly, a decoding process corresponds to the above encoding process is provided as below.

In some embodiments, as illustrated by the video decoding method 600 shown in FIG. 6, in the box 620, the recovering, based on the plurality of syntax structures and the size of region, the plurality of quantization levels comprising the last non-zero quantization level within the plurality of defined regions in the predefined scan order includes: in response to determining that the predefined scan order is a forward scan order from a first position index within the block to a position index of the last non-zero quantization level within the block, recovering the quantization levels of the plurality of defined regions from the plurality of syntax structures in the forward scan order.

Example 7

For FSC, all the region_flag[i] s wherein i is an integer between 0 and (L−1) may be coded into the bitstream. If all the region_flag[i] s wherein i is an integer between 0 and (L−2) are equal to 1, the region_flag[L−1] (i.e., the last region_flag) will not be coded into the bitstream and the value of region_flag[L−1] will be inferred to be equal to 0 which indicates that there is at least one non-zero quantization level within this region. Similarly, region_flag[i] equal to 1 means that all the quantization levels within the i-th region[i] are zeros, and there is no need to code each individual level within this region. region_flag[i] equal to 0 means that there is at least one non-zero quantization level within the i-th region[i] and each individual level will be coded in scan order according to the level coding method specified in the AVM.

Further, in the present disclosure, if some cases occur frequently, then related information can be bypassed for coding to improve coding efficiency. For example, if some defined regions for FSC are frequently in a case of the region_flags equal to "1" other than the last region_flag, then the last region_flag may be bypassed to be coded into bitstream for improving video compression coding efficiency.

In some embodiments, as illustrated by the video encoding method 500 shown in FIG. 5, in the box 520, the generating, based on the quantization levels within the plurality of defined regions in the predefined scan order, the plurality of syntax structures associated with the plurality of defined regions includes: in response to determining that the predefined scan order is the forward scan order and that all of the quantization levels within each of the defined regions other than the last-forward defined region are equal to zero, generating a respective region syntax structure based on a respective syntax element associated with each of the defined regions other than the last-forward defined region, wherein the respective syntax element associated with each of the defined regions other than the last-forward defined region is determined as in a first state, and a last syntax element associated with the last-forward defined region is predefined as in a second state. Correspondingly, a decoding process corresponds to the above encoding process is provided as below.

In some embodiments, as illustrated by the video decoding method 600 shown in FIG. 6, in the box 620, the recovering, based on the plurality of syntax structures and the size of region, the plurality of quantization levels comprising the last non-zero quantization level within the plurality of defined regions in the predefined scan order includes: in response to determining that the predefined scan order is the forward scan order, and that a respective syntax element associated with each of the defined regions other than the last-forward defined region are determined as in a first state and that a last syntax element associated with the last-forward defined region does not be found from a respective region syntax structure and is predefined as in a second state, recovering all of the quantization levels within each of the defined regions other than the last-forward defined region as equal to zero based on the size of region.

In the above description, in the present disclosure, the provided region_flag[i] may be coded either in the bypass mode or the context adaptive mode. If they are coded as context-coded bins, the context model may be updated based upon the previous coded region_flags.

In addition, the above methods can be used for a region-based residual coding for both RCRT and FSC for providing better video compression coding efficiency. If there are consecutive zero quantization levels between non-zero quantization levels in a block, all quantization levels in the block are divided into a plurality of region, and a plurality of defined regions are further selected from the plurality of region based on the position of last non-zero quantization level. In such a way, in a case that the plurality of defined regions is a plurality of defined regions, those defined regions having all zero quantization levels can be represented by a respective syntax element rather than the original consecutive zero quantization levels within those defined regions. Because the syntax element presenting the consecutive zero level is used for the region-based residual coding for both RCRT and FSC, there is no need to code the consecutive zero level presented by the syntax element into the bitstream, thereby providing better video compression coding efficiency.

Figure 7:
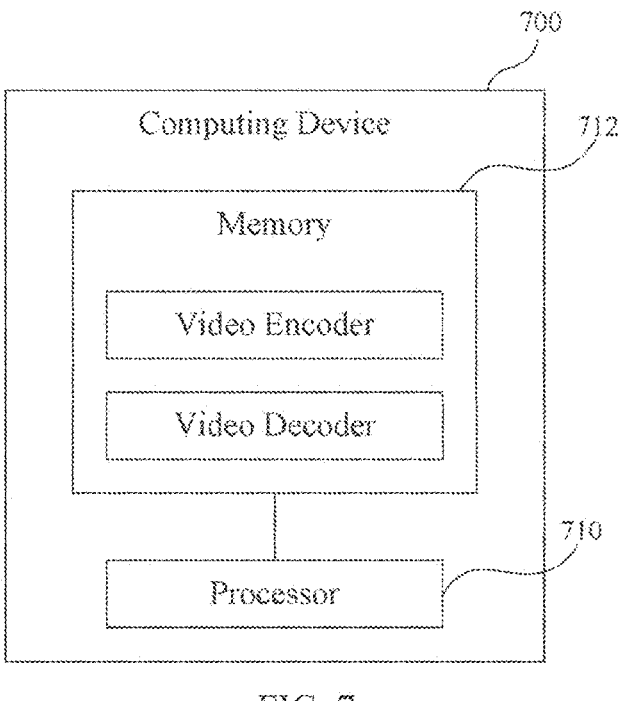
FIG. 7 is a schematic block diagram illustrating an example of a computing device according to an embodiment of the present disclosure.

Further, any suitable computing system can be used for performing the operations for video encoding like a video encoder or video decoding like a video decoder described herein. For example, FIG. 7 depicts an example of a computing device 700 that can implement methods such as video encoding methods or video decoding methods herein.

In some embodiments, the computing device 700 can include a processor 710 that is coupled to a memory 712 and is configured to execute program instructions stored in the memory 712 to perform the operations for implementing a video encoding method associated with a video encoder or a video decoding method associated with a video decoder.

For example, the processor 710 may comprise a microprocessor, an application-specific integrated circuit ("ASIC"), a state machine, or other processing device. The processor 710 can include one or more processing units. Such a processor can include or may be in communication with a computer-readable medium storing instructions that, when executed by the processor 710, cause the processor to perform the operations described herein. The memory 712 can include any suitable non-transitory computer-readable medium.

For example, the computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer programming language, including, for example, C, C++, C#, Visual Basic, Java, Python, Perl, JavaScript, and ActionScript.

In some embodiments, the present disclosure provides that a video encoding system includes: a processor; and a memory coupled to the processing unit, wherein the processor is configured to execute program instructions stored in the memory to perform any one of the above video encoding methods.

In some embodiments, the present disclosure provides that a non-transitory computer-readable medium having program code stored thereon, the program code executable by a processor to execute any one of the above video encoding methods.

In some embodiments, the present disclosure provides that a video encoding system includes: a processor; and a memory coupled to the processing unit, wherein the processor is configured to execute program instructions stored in the memory to perform any one of the above video decoding methods.

In some embodiments, the present disclosure provides that a non-transitory computer-readable medium having program code stored thereon, the program code executable by a processor to execute any one of the above video decoding methods.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized in other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated into one processing unit, physically independent, or integrated in one processing unit with two or more than two units.

If the software function unit is realized and used and sold as a product, it can be stored in a readable storage medium in a computer. Based on this understanding, the technical plan provided by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random-access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A video encoding method, comprising:
   dividing, based on a size of region, a plurality of quantization levels comprising a last non-zero quantization level within a block of a video into a plurality of regions in a level coding scan order to select a plurality of defined regions among the plurality of regions based on the last non-zero quantization level;
   generating, based on the quantization levels within the plurality of defined regions in a predefined scan order, a plurality of syntax structures associated with the plurality of defined regions; and
   encoding the plurality of syntax structures associated with the plurality of defined regions into a bitstream;
   wherein the generating, based on the quantization levels within the plurality of defined regions in the predefined scan order, the plurality of syntax structures associated with the plurality of defined regions comprises:
       in response to determining that the predefined scan order is a forward scan order from a first position index within the block to a position index of the last non-zero quantization level within the block, generating the plurality of syntax structures based on the quantization levels within the plurality of defined regions from a first-forward defined region associated with the first position index to a last-forward defined region associated with a position index of the last non-zero quantization level, region by region; and
       in response to determining that the predefined scan order is a reverse scan order from the position index of the last non-zero quantization level within the block to the first position index within the block, generating the plurality of syntax structures based on the quantization levels within the plurality of defined regions from a first-reverse defined region associated with the position index of the last non-zero quantization level to a last-reverse defined region associated with the first position index, region by region.

2. The method of claim 1, wherein the generating, based on the quantization levels within the plurality of defined regions in the predefined scan order, the plurality of syntax structures associated with the plurality of defined regions comprises:
   generating a plurality of syntax elements associated with the plurality of defined regions based on the quantization levels within the plurality of defined regions and the last non-zero quantization level; and
   generating the plurality of syntax structures based on the plurality of syntax elements, the quantization levels within the plurality of defined regions, and the last non-zero quantization level.

3. The method of claim 2, wherein the generating the plurality of syntax elements associated with the plurality of defined regions based on the quantization levels within the plurality of defined regions and the last non-zero quantization level comprises:
   determining whether all of the quantization levels within a respective defined region or the quantization levels within the respective defined region other than the last non-zero quantization level are equal to zero; and
   generating, based on a determination of whether all of the quantization levels within the respective defined region or the quantization levels within the respective defined region other than the last non-zero quantization level are equal to zero, a respective syntax element of the plurality of syntax elements.

4. The method of claim 3, wherein a respective region syntax structure associated with the respective defined region comprises one of elements comprising:
   the respective syntax element;
   the quantization levels within the respective defined region;
   a combination of the respective syntax element and the last non-zero quantization level; and
   a combination of the respective syntax element and the quantization levels within the respective defined region.

5. The method of claim 1, wherein the generating, based on the quantization levels within the plurality of defined regions in the predefined scan order, the plurality of syntax structures associated with the plurality of defined regions comprises:
   in response to determining that the predefined scan order is the reverse scan order and that all of the quantization levels other than the last non-zero quantization level within a first-reverse defined region in the reverse scan order are equal to zero, generating a respective region syntax structure based on a respective syntax element associated with the first-reverse defined region and the last non-zero quantization level within the first-reverse defined region, wherein the syntax element associated with the first-reverse defined region is determined as in a first state; and
   in response to determining that the predefined scan order is the reverse scan order and that not all of the quantization levels other than the last non-zero quantization level within the first-reverse defined region are equal to zero, generating the respective region syntax structure based on the respective syntax element associated with the first-reverse defined region and all of the quantization levels within the first-reverse defined region in the reverse scan order, wherein the syntax element associated with the first-reverse defined region is determined as in a second state.

6. The method of claim 1, wherein the generating, based on the quantization levels within the plurality of defined regions in the predefined scan order, the plurality of syntax structures associated with the plurality of defined regions comprises:

in response to determining that the predefined scan order is the reverse scan order and that not all of the quantization levels within a specified region as the first-reverse defined region or the last-reverse defined region or each of the first-reverse defined region and the last-reverse defined region are equal to zero, generating a respective region syntax structure based on all of the quantization levels within the specified region in the reverse scan order, wherein a respective syntax element associated with the specified region is predefined as in a second state; and in response to determining that the predefined scan order is the reverse scan order and that all of the quantization levels within the specified region are equal to zero, generating the respective region syntax structure based on the respective syntax element associated with the specified region, wherein the respective syntax element associated with the specified region is determined as in a first state.

7. The method of claim 1, wherein the generating, based on the quantization levels within the plurality of defined regions in the predefined scan order, the plurality of syntax structures associated with the plurality of defined regions comprises:

in response to determining that the predefined scan order is the reverse scan order and that all of the quantization levels within each of the defined regions other than a specified region as the first-reverse defined region or the last-reverse defined region or each of the first-reverse defined region and the last-reverse defined region are equal to zero, generating a respective region syntax structure based on a respective syntax element associated with each of the defined regions other than the specified region, wherein the respective syntax element associated with each of the defined regions other than the specified region is determined as in a first state; and in response to determining that the predefined scan order is the reverse scan order and that not all of the quantization levels within each of the defined regions other than the specified region are equal to zero, generating the respective region syntax structure based on all of the quantization levels within each of the defined regions other than the specified region in the reverse scan order and the respective syntax element associated with each of the defined regions other than the specified region, wherein the respective syntax element associated with each of the defined regions other than the specified region is determined as in a second state.

8. The method of claim 5, wherein the generating, based on the quantization levels within the plurality of defined regions in the predefined scan order, the plurality of syntax structures associated with the plurality of defined regions comprises:

in response to determining that the predefined scan order is the reverse scan order and that a number of the quantization levels within one of the plurality of defined regions is less than the size of region, determining that a number of the quantization levels within the first-reverse defined region or the last-reverse defined region is less than the size of region.

9. A video decoding method, comprising:

receiving a plurality of syntax structures associated with a plurality of defined regions from a bitstream of a video;

recovering, based on the plurality of syntax structures and a size of region, a plurality of quantization levels comprising a last non-zero quantization level within the plurality of defined regions in a predefined scan order; and reconstructing the plurality of quantization levels within the plurality of defined regions among a plurality of regions within a block of the video in a level coding scan order;

wherein the recovering, based on the plurality of syntax structures and the size of region, the plurality of quantization levels comprising the last non-zero quantization level within the plurality of defined regions in the predefined scan order comprises:

in response to determining that the predefined scan order is a forward scan order from a first position index within the block to a position index of the last non-zero quantization level within the block, recovering the quantization levels within the plurality of defined regions from a first-forward defined region associated with the first position index to a last-forward defined region associated with a position index of the last non-zero quantization level, region by region; and in response to determining that the predefined scan order is a reverse scan order from the position index of the last non-zero quantization level within the block to the first position index within the block, recovering the quantization levels within the plurality of defined regions from a first-reverse defined region associated with the position index of the last non-zero quantization level within the block to a last-reverse defined region associated with the first position index, region by region.

10. The method of claim 9, wherein the recovering, based on the plurality of syntax structures and the size of region, the plurality of quantization levels comprising the last non-zero quantization level within the plurality of defined regions in the predefined scan order comprises:

in response to determining that the predefined scan order is the forward scan order from the first position index within the block to the position index of the last non-zero quantization level within the block, recovering the quantization levels of the plurality of defined regions from the plurality of syntax structures in the forward scan order; and in response to determining the predefined scan order is the reverse scan order from the position index of the last non-zero quantization level within the block to the first position index within the block, recovering the quantization levels of a respective defined region of the plurality of defined regions from a respective region syntax structure of the plurality of syntax structures in the reverse scan order.

11. The method of claim 9, wherein the recovering, based on the plurality of syntax structures and the size of region, the plurality of quantization levels comprising the last non-zero quantization level within the plurality of defined regions in the predefined scan order comprises:

in response to determining that the predefined scan order is the reverse scan order and that a respective syntax element associated with the first-reverse defined region in the reverse scan order is determined as in a first state, recovering the plurality of quantization levels within a respective defined region based on the last non-zero quantization level within the first-reverse defined region from a respective region syntax structure and all of the quantization levels other than the last non-zero quantization level within the first-reverse defined region as equal to zero based on the size of region; and in response to determining that the predefined scan order is the reverse scan order and that the respective syntax element associated with the first-reverse defined region is determined as in a second state, recovering the plurality of quantization levels within the respective defined region based on all of the quantization levels within the first-reverse defined region from the respective region syntax structure in the reverse scan order.

12. The method of claim 9, wherein the recovering, based on the plurality of syntax structures and the size of region, the plurality of quantization levels comprising the last non-zero quantization level within the plurality of defined regions in the predefined scan order comprises:

in response to determining that the predefined scan order is the reverse scan order and that a respective syntax element associated with a specified region as the first-reverse defined region or the last-reverse defined region or each of the first-reverse defined region and the last-reverse defined region does not be found from a respective region syntax structure and is predefined as in a second state, recovering all of the quantization levels within the specified region from the respective region syntax structure in the reverse scan order; and in response to determining that the predefined scan order is the reverse scan order and that the respective syntax element associated with the specified region is determined as in a first state, recovering all of the quantization levels within the specified region as equal to zero based on the size of region.

13. The method of claim 9, wherein the recovering, based on the plurality of syntax structures and the size of region, the plurality of quantization levels comprising the last non-zero quantization level within the plurality of defined regions in the predefined scan order comprises:

in response to determining that the predefined scan order is the reverse scan order and that a respective syntax element associated with each of the defined regions other than a specified region as the first-reverse defined region or the last-reverse defined region or each of the first-reverse defined region and the last-reverse defined region is determined as in a first state, recovering all of the quantization levels within each of the defined regions other than the specified region as equal to zero based on the size of region; and in response to determining that the predefined scan order is the reverse scan order and that the respective syntax element associated with each of the defined regions other than the specified region is determined as in a second state, recovering all of the quantization levels within each of the defined regions other than the specified region from a respective region syntax structure in the reverse scan order.

14. The method of claim 11, wherein the recovering, based on the plurality of syntax structures and the size of region, the plurality of quantization levels comprising the last non-zero quantization level within the plurality of defined regions in the predefined scan order comprises:

in response to determining that the predefined scan order is the reverse scan order and that a number of the quantization levels within one of the plurality of defined regions is less than the size of region, determining that a number of the quantization levels within the first-reverse defined region or the last-reverse defined region is less than the size of region.

15. The method of claim 9, wherein the recovering, based on the plurality of syntax structures and the size of region, the plurality of quantization levels comprising the last non-zero quantization level within the plurality of defined regions in the predefined scan order comprises:

in response to determining that the predefined scan order is the forward scan order, and that a respective syntax element associated with each of the defined regions other than the last-forward defined region are determined as in a first state and that a last syntax element associated with the last-forward defined region does not be found from a respective region syntax structure and is predefined as in a second state, recovering all of the quantization levels within each of the defined regions other than the last-forward defined region as equal to zero based on the size of region.

16. The method of claim 9, wherein the recovering, based on the plurality of syntax structures and the size of region, the plurality of quantization levels comprising the last non-zero quantization level within the plurality of defined regions in the predefined scan order comprises:

in response to determining that the predefined scan order is the reverse scan order and that a respective syntax element associated with the first-reverse defined region does not be found from a respective region syntax structure, recovering all of the quantization levels within the first-reverse defined region from the respective region syntax structure in the reverse scan order.

17. The method of claim 9, wherein the reconstructing plurality of quantization levels within the plurality of defined regions among the plurality of regions within the block of the video in the level coding scan order comprises:

calculating a number of the regions within the block according to the size of region and a number of the quantization levels within the block;

in response to determining that the predefined scan order is the forward scan order from the first position index within the block to the position index of the last non-zero quantization level within the block, calculating that a number of the defined regions is equal to a number of the regions; and in response to determining that the predefined scan order is the reverse scan order from the position index of the last non-zero quantization level within the block to the first position index within the block, calculating a number of the defined regions according to the size of region and the position index of the last non-zero quantization level within the block, wherein the number of the defined regions is less than or equal to the number of the regions within the block.

18. A non-transitory computer-readable medium having program code stored thereon, the program code executable by a processor to execute the method of claim 9.

* * * * *